(12) United States Patent
Xiang et al.

(10) Patent No.: US 10,111,192 B2
(45) Date of Patent: Oct. 23, 2018

(54) METHOD FOR EFFECTIVE PMTU DISCOVERY IN VPN ENVIRONMENT

(71) Applicant: Dell Software Inc., Round Rock, TX (US)

(72) Inventors: Dong Xiang, Shanghai (CN); Yicheng He, Shanghai (CN); Yanjun Yang, Shanghai (CN); Li Zhao, Shanghai (CN)

(73) Assignee: SONICWALL INC., Milpitas, CA (US)

( * ) Notice: Subject to any disclaimer, the term of this patent is extended or adjusted under 35 U.S.C. 154(b) by 139 days.

(21) Appl. No.: 15/171,330

(22) Filed: Jun. 2, 2016

(65) Prior Publication Data

US 2017/0353935 A1  Dec. 7, 2017

(51) Int. Cl.
| | |
|---|---|
| *H04L 12/50* | (2006.01) |
| *H04W 56/00* | (2009.01) |
| *H04L 12/46* | (2006.01) |
| *H04L 12/805* | (2013.01) |
| *H04L 12/801* | (2013.01) |

(52) U.S. Cl.
CPC ..... *H04W 56/0015* (2013.01); *H04L 12/4633* (2013.01); *H04L 12/4641* (2013.01); *H04L 47/10* (2013.01); *H04L 47/36* (2013.01); *H04L 47/365* (2013.01)

(58) Field of Classification Search
CPC . H04L 12/4633; H04L 12/4641; H04L 47/10; H04L 47/36; H04L 47/365; H04W 56/0015

USPC ........ 370/216, 231, 252, 400, 470, 472, 474
See application file for complete search history.

(56) References Cited

U.S. PATENT DOCUMENTS

| | | | | |
|---|---|---|---|---|
| 6,212,190 B1 * | 4/2001 | Mulligan | ................ | H04L 47/10 370/400 |
| 9,544,240 B1 * | 1/2017 | Przygienda | ........... | H04L 45/586 |
| 9,923,835 B1 * | 3/2018 | Singh | .................... | H04L 47/365 |
| 2003/0185208 A1* | 10/2003 | Lee | ......................... | H04L 45/12 370/389 |
| 2003/0188015 A1* | 10/2003 | Lee | ......................... | H04L 69/16 709/238 |
| 2005/0041635 A1* | 2/2005 | Chung | ................... | H04L 47/10 370/351 |
| 2010/0131670 A1* | 5/2010 | Ishii | ........................ | H04L 47/10 709/233 |
| 2014/0233565 A1* | 8/2014 | Mahapatra | .............. | H04L 45/74 370/392 |
| 2017/0264518 A1* | 9/2017 | Singh | ..................... | H04L 69/22 |

* cited by examiner

*Primary Examiner* — Harun Chowdhury
(74) *Attorney, Agent, or Firm* — Polsinelli LLP (57) ABSTRACT

Methods are directed towards initializing a path maximum transmission unit value for two gateways in communication via a network tunnel (e.g., VPN environment). The initialized path maximum transmission unit value is used in establishing the network tunnel of the two gateways. Methods are also directed towards synchronizing path maximum transmission unit values for the two gateways after the network tunnel has been established. These methods minimize the occurrence of dropped data packets arising from mismatched path maximum transmission unit value between the gateways.

15 Claims, 6 Drawing Sheets

| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
| 0 | 0 | Next Payload ||||||||  RESERVED ||||||||  Payload Length ||||||||||||||||
| 4 | 32 | Protocol ID |||||||| C | SPI Size |||||||  40959 (Notify Message Type) ||||||||||||||||
| 8 | 64 | Security Parameter Index (SPI) ||||||||||||||||||||||||||||||||
| 12 | 96 | MTU Value (Notification Data) ||||||||||||||||||||||||||||||||

FIG. 6

METHOD FOR EFFECTIVE PMTU DISCOVERY IN VPN ENVIRONMENT

BACKGROUND OF THE INVENTION

Field of Invention

The present invention generally relates to path maximum transmission unit discovery. More specifically, the present invention relates to a more effective method for path maximum transmission unit discovery.

Description of the Related Art

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, internet of things (IOT) monitoring and communications, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination.

Maximum transmission unit (MTU) can describe how much data can be transferred via the information handling system described above. In particular, MTU corresponds to a size (e.g., in bytes or octets) of the largest protocol data unit that can be transmitted between two Internet Protocol (IP) hosts. A larger MTU can bring greater efficiency because each data packet transmitted using the network carries more data. A larger MTU also means processing of fewer data packets for the same amount of data.

However, there are also downsides for choosing too large of an MTU. For example, large data packets can occupy the network for more time than smaller data packets, which may cause delays for subsequent data packets being transmitted. The delays can contribute to increasing lag and latency over the network. Large data packets also require that the entire data packet be retransmitted if a single error is found. It may be that larger packets are more likely to be corrupt.

Path maximum transmission unit discovery (PMTUD) is a standardized technique used in computer networks that is used to determine a size for a maximum transmission unit (MTU) to be used in a network path between two Internet Protocol (IP) hosts. Network paths may have a pre-determined MTU size associated with the data packets that can be transmitted across that network path. Any data packets that have an MTU size larger than the pre-determined MTU size of the network path would need to be broken down into smaller portions in order to be transmitted. Therefore, the primary purpose of PMTUD is to obtain the MTU size for transmission of data packets that can be used on the network path that avoids fragmentation of the transmitted data packets between the two IP hosts (i.e. IP fragmentation).

When IP fragmentation occurs, an initial packet of data being transmitted in the network may be broken up into multiple smaller packets of data. IP fragmentation may occur when the transmitted packet MTU size is larger than MTU size of the network path between the two IP hosts. IP fragmentation creates these smaller packets from the initial packet of data that can now be transmitted between the two IP hosts through the network. When IP fragmentation occurs, however, the initial data packet may be dropped from the network one or more times until the data packet is broken into a size that is transmittable based on the MTU size of the network path. In situations where the MTU size of the network path between two VPN hosts fluctuates, frequent dropping of data packets can negatively impact the quality of the network since errors and transmissions of the same data packets may occur numerous times.

Furthermore, the data packets being transmitted may also change in size based on the additional information associated with the data being transmitted between the two IP hosts. For example, IPSecurity (or Internet security protocol) is a technology that deploys Virtual Private Networks (VPNs) that provides encryption and authentication protection for communications using public networks. The IPSecurity (aka IPsec) protocol includes additional information transmitted with the data packet for security purposes. Such additional information includes authentication header and encapsulating security payload). The inclusion of the IPsec protocols may increase the size of the data packet being transmitted between the two IP hosts. In some situations, the size of the data packet may be greater than the MTU of the network path.

In view of the above, there is a need for an improved method that keeps the PMTU information synched between the two IP hosts. This improved method would facilitate more efficient transmission of data. Such methods would improve how virtual private networks (VPN) send and receive data across networks.

SUMMARY OF THE CLAIMED INVENTION

A method for path maximum transmission unit discovery is presently claimed. The method includes performing tunnel negotiations between a first gateway and a second gateway in order to establish a network tunnel for the gateways usable to transmit data packets having an initial path maximum transmission unit value. The tunnel negotiations include calculating a maximum transmission unit value for each gateway, advertising the calculated value, acknowledging receipt of the advertised calculated value and calculating an initial maximum transmission unit value for both gateways. This initial maximum transmission unit value is used in the established network tunnel to transmit data packets between the gateways to ensure that data packets are not dropped during transmission.

A method for syncing path maximum transmission unit values between two gateways using an already established network tunnel is also claimed. The method detects changes in maximum transmission unit value associated with at least one of the gateways after the network tunnel has been established. The detected change is advertised to the other gateway associated with the network tunnel. After acknowledging receipt of the advertised change in the maximum transmission unit value, each of the gateways update their own maximum transmission unit value based on the advertised change. This updated maximum transmission unit value is used by the gateways to transmit subsequent data packets across the network tunnel in order to ensure that the transmitted data packets are not dropped.

DETAILED DESCRIPTION

The systems and methods described herein are directed towards a different path MTU discovery (PMTUD) than what has been previously used in the art. In particular, the present systems and methods implement communication for the network paths so that each IP host (e.g., VPN gateways) knows their peer's MTU during tunnel negotiations. This communication sets an ideal PMTU value for the network path between each IP host at the beginning before transmission of data begins. Furthermore, the systems and methods also monitor changes in the MTU values for each of the IP host while transmission of data is occurring. If one or both of the IP hosts' MTU value changes, this change is identified and synchronized accordingly. In this way, the PMTU is recalculated to an appropriate value immediately so that future data packets can be formed to satisfy the updated MTU value. The systems and methods provide a more efficient way for these network communications (e.g., in VPN environments) to communicate since less data packets are dropped as communication between the IP host occurs.

Figure 1:
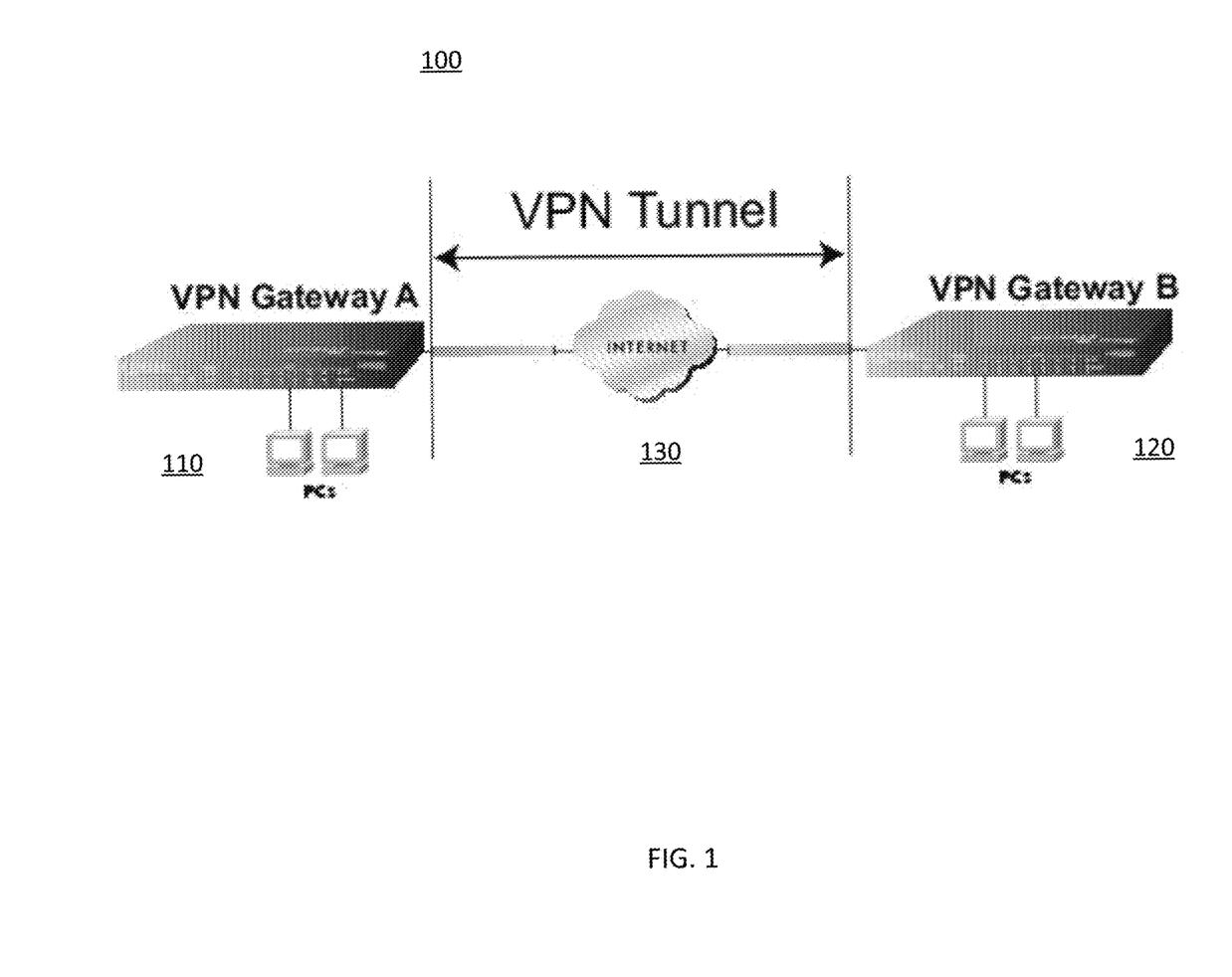
FIG. 1 illustrates an exemplary enterprise network.

FIG. 1 illustrates an exemplary enterprise network 100. For purposes of this disclosure, the enterprise network may include one or more information handling systems that may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a smart phone, a PDA, a mobile information handling system, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

As illustrated in FIG. 1, there are two gateways: gateway A (110) and gateway B (120). These two gateways are in communication with each other via an established VPN tunnel (i.e. VPN network) (130). Each of the gateways A (110) and B (120) each have an associated maximum transmission unit (MTU) value that specifies the amount of data that can be transmitted and received by that particular gateway. In situations where the MTU values of both gateways (110, 120) match, each of the gateways can transmit and receive data from each other with no issues. However, issues arise when the MTU values of both gateways (110, 120) are different. In many situations, the difference in the MTU values of the two gateways (110, 120) cause inefficiencies in the network communications.

Figure 2:
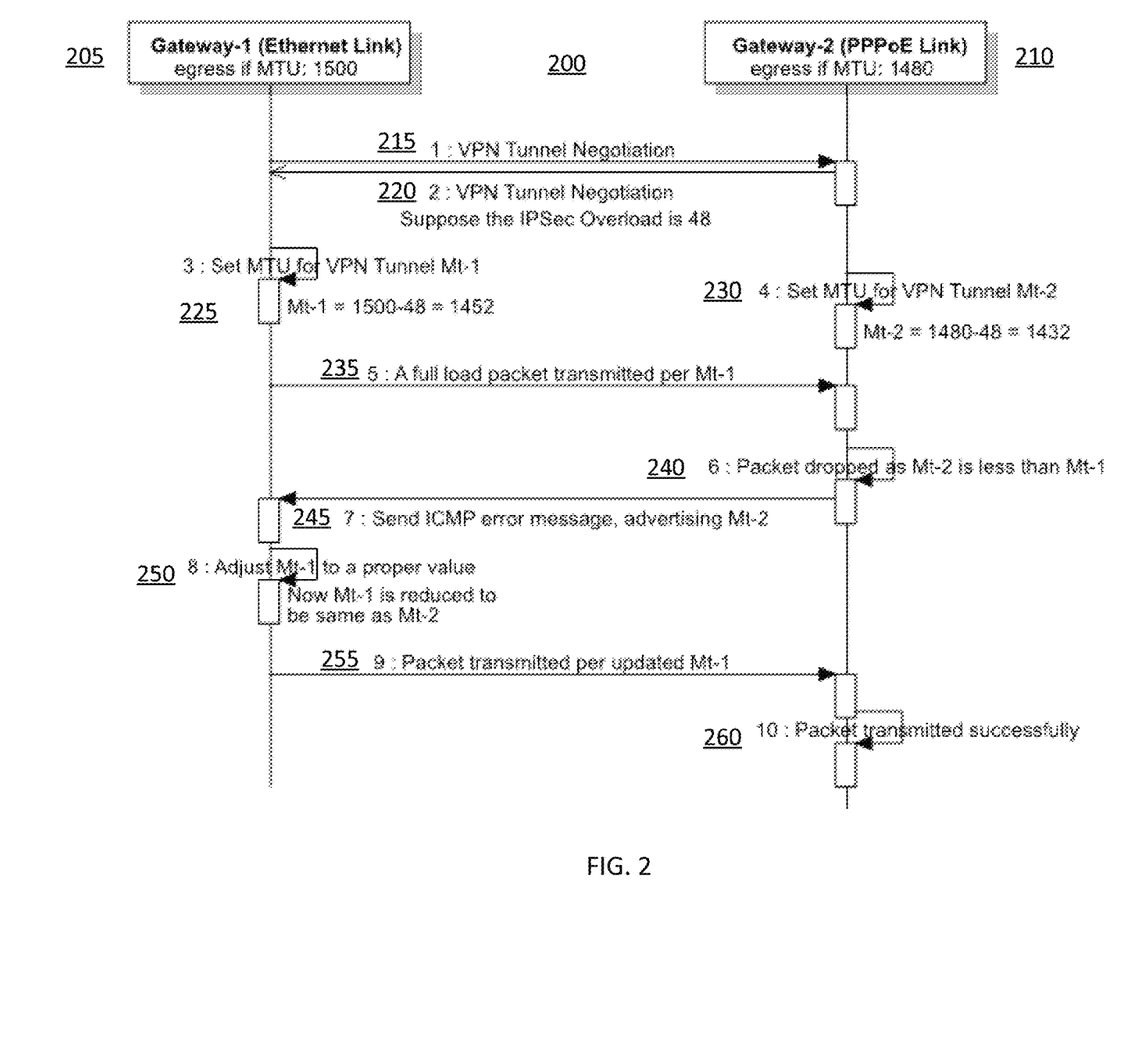
FIG. 2 illustrates an existing method of Path Maximum Unit Transmission Discovery (PMTUD).

FIG. 2 illustrates an existing method 200 of Path Maximum Unit Transmission Discovery (PMTUD). In particular, FIG. 2 illustrates the method 200 for PMTUD that is currently implemented in networks for situations where two MTU values between the gateways within the VPN network are not the same.

With each of the gateways 205, 210 associated with the two IP hosts, the network path MTU will be initialized based on the physical interface used. For example, Gateway-1 (205) may be a home office gateway that is using a PPPoE (Point-to-Point Protocol over Ethernet) link. This gateway 205 may have, for example, an initial MTU of 1500. With respect to Gateway-2 (210), this gateway may correspond to an Ethernet link that has an MTU of 1480. Furthermore, the method 200 may take into account any identified offset MTU value corresponding to associated overload (e.g., IPSecurity) information (e.g., authentication header) that will be included with the data packets during transmission between Gateway-1 (205) and Gateway-2 (210). Described below, with reference to FIG. 6, the header is used to transmit MTU-related information between gateways.

In step 1 (215) and step 2 (220) of the method 200 illustrated in FIG. 2, each of the gateways 205, 210 establishes a network tunnel used to transmit data packets between Gateway-2 (105) and Gateway-2 (210). The tunnel negotiations described in steps 1 and 2 may occur simultaneously. At this point in time, neither gateway 205, 210 knows of their peer's respective MTU value. Each gateway 205, 210 only knows of their own MTU value. The MTU values of a particular gateway may depend on a variety of different factors, for example, on the type of network or physical interface being used or network condition a particular gateway is operating with.

In step 3 (225) and step 4 (230), each of the gateways 205, 210 calculate a MTU value that will be used by each respective gateway to transmit data packets across the network tunnel. As discussed above, the MTU value controls a maximum size of the overall data packet that can be transmitted and received across the network tunnel associated with that gateway. The calculated tunnel MTU for a particular gateway takes into account the MTU value of the gateway along with the overhead that will be added to each of the data packet. Therefore, as illustrated in FIG. 1, Gateway-1 (205) calculates a MTU value of 1452 and Gateway-2 (210) calculates a MTU value of 1432. Each of these gateways take into account the overhead illustrated in the figure (e.g., IPSec overload is 48)

In step 5 (135), Gateway-1 (205) begins transmitting data packets to Gateway-2 (210). The data packets are transmitted using the MTU value calculated in step 3 (225). As illustrated in FIG. 1, Gateway-1 (205) transmits a data packet having an MTU value of 1452. The MTU value corresponds to the size of the data packet being transmitted from gateway 1 (205) to gateway 2 (210).

In step 6 (240), Gateway-2 (210) detects that the data packet being transmitted from Gateway 1 (205) has a higher MTU value (e.g., 1452) than what is currently able to be received by Gateway-2 (210). As indicated above, the MTU value for Gateway-2 (210) was calculated in step 4 (230). Since Gateway-2 (210) has an MTU value of 1432, which corresponds to the size of the data packet that can be received by gateway 2 (210), that is smaller than that of the data packet being transmitted from Gateway 1 (205), gateway-2 (210) will not able to receive the data packet currently being transmitted from Gateway-1 (205). Therefore, the data packet being transmitted from gateway 1 (205) would need to be dropped.

In step 7 (245), Gateway-2 (210) provides an error message via an Internet Control Message Protocol to Gateway-1 (205) indicating that the transmission of the data was incomplete. The error message may indicate that the current data packets were dropped because the MTU value for the transmitted data packets was larger than the MTU value of Gateway-2 (210). Gateway-2 (210) also provides its current MTU value to Gateway-1 (205) at this time as well.

By using the information provided by gateway 2 (210) in the error message via step 7 (245), Gateway-1 (205) can adjust its own MTU value accordingly to match that of gateway 2 (210) (see step 8 (250)). By adjusting its MTU value based on Gateway-2's (210) MTU value, Gateway-1 (205) can ensure that future transmitted data packets can be properly received by Gateway-2 (210).

Retransmission of the previously dropped packet (first transmitted in step 5 (235)) can then be performed in step 9 (255). The data packets are transmitted from Gateway-1 (205) using the new MTU value from Gateway-2 (210).

In step 10 (260), Gateway-2 (210) notes that the data packets being transmitted from Gateway 1 (205) now can be received due to the adjusted MTU value of the transmitted data packets. In particular, the data packets are of the appropriate size that correspond to the current MTU value of gateway-2 (210).

Even though the data packets will eventually be transmitted from Gateway-1 (205) to Gateway-2 (210) as illustrated in FIG. 1 (after completion of steps 1-10), inefficiencies arise because of the occurrence of dropped packets when one gateway detects data packets having a higher MTU value than it can receive based on its own MTU value (e.g., Step 6).

Even after the MTU values are synchronized between the two gateways, events may occur after the establishment of the network path that causes one or more of the gateways to adjust their own MTU value. For example, an administrator may change the MTU value of one gateway. Performance of the gateway (e.g., damage, malfunction) may also cause fluctuations in the MTU value. Whenever one or more of the MTU values change, presumably PMTUD (as illustrated in FIG. 2) would need to be carried out again to account for the updated MTU values for the two gateways.

Figure 3:
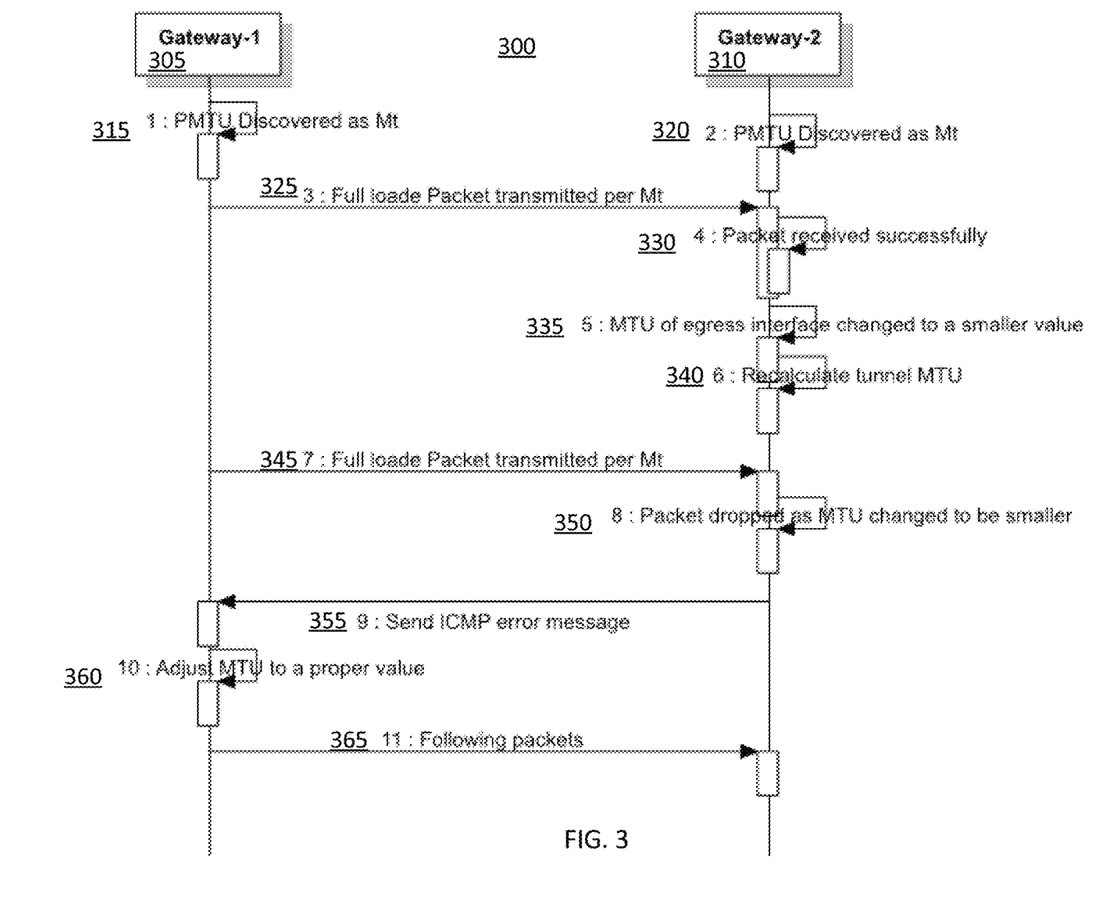
FIG. 3 illustrates an existing method of PMTUD where the MTU value of a gateway changes.

FIG. 3 illustrates an existing method 300 of PMTUD where the MTU value of a gateway changes. In particular, once the MTU value between the two gateways has been initially synchronized (i.e. PMTUD), one or more of the gateways change their own MTU value again thereby requiring another PMTUD to synchronize the MTU values again between the gateways.

The method 300, as illustrated in FIG. 3, starts off similar to FIG. 2. Both Gateway-1 (305) and Gateway-2 (310) have established an MTU value for the data packets that will be transmitted and received from each gateway. In step 1 (315) and step 3 (220), Gateway-1 (305) and Gateway-2 (310) discover their own appropriate MTU value similar to what was described above in step 3 (225) and step 4 (230) of FIG. 2. This discovery may also be similar to step 7 (240) of FIG. 2 as well where one or both of the gateways may have been previously informed of their peer's MTU value.

Returning to FIG. 3, step 3 (325) shows a data packet transmission between Gateway-1 (305) and Gateway-2 (310). Presuming that the MTU value for Gateway-1 (305) is less than or equal to the MTU value for Gateway-2 (310), the data packet would be received successfully at Gateway-2 (310) (as indicated via step 4 (330)).

In step 5 (335), however, the MTU value for Gateway-2 (310) changes. Such change may happen for one or more various reasons as indicated above (e.g., administrator, damage). Once a change has been detected, an updated MTU value is calculated for Gateway-2 (310) in step 6 (340). If the updated MTU value of Gateway-2 (310) increases, there may be no issues with respect to receiving data packets from Gateway-1 (305) since Gateway-2 (310) would have an MTU value greater than the MTU value for Gateway-1 (305). In other words, if the MTU value of Gateway-2 (310) increases, it corresponds to the capability of receiving larger data packets than what Gateway-1 (305) is currently transmitting. However, transmission of data packets from Gateway-2 (310) to Gateway-1 (305) (not shown) would raise errors and result in the dropping of data packet similar to what was described in FIG. 2 step 6 (240) and step 7 (245). The error would arise since gateway-2 (310) would be transmitting data packets of a particular size (corresponding to its current MTU value) that would be larger than what can be received by gateway 1 (305).

Alternatively, if the updated MTU value of Gateway-2 (310) decreases such that the MTU value of Gateway-2 (310) is smaller than that of Gateway-1 (305), when data packets are transmitted from Gateway-1 (305) to Gateway-2 (310) (as seen in step 7 (345)), the outcome is similar to step 6 (240) and step 7 (245) of FIG. 2. In particular, as illustrated in FIG. 3, step 8 (350) shows that the received data packets from Gateway-1 (305) are dropped because the MTU value for Gateway-2 (310) is smaller than the MTU value of data packets being transmitted from Gateway-1 (305). As described above, this corresponds to the situation that Gateway-2 (310) is attempting to receive data that is larger than its current MTU value being transmitted from Gateway-1 (305).

Subsequent to the dropping of the packets, Gateway-2 (310) provides a similar ICMP error message in step 9 (355) that indicates to Gateway-1 (305) that the previous transmitted data packets were dropped. The error message may also inform Gateway-1 (305) of the updated MTU value for Gateway-2 (310).

In step 10 (360), Gateway-1 (305) updates its own MTU value based on the information provided from Gateway-2 (310) via step 9 (355). The new updated MTU value for Gateway-1 (305) is then used to retransmit the dropped data packet and to control the transmission of future data packets (at least until the next MTU change of one or both of the gateways) to Gateway-2 (310). As illustrated in step 11 (265), Gateway-2 (310) is capable of receiving the re transmitted data packets from Gateway-1 (305).

Step 10 (360) and step 11 (365) of FIG. 3 mirror step 8 (255) and step 9 (260) of FIG. 2. In each of these cases, a network path (i.e. tunnel) is being updated so that communications between the gateways can be established where data packets can be transmitted and received without fragmentation. However, in both of these scenarios (as illustrated in FIG. 2 and FIG. 3), error messages and data packet droppings would occur thereby triggering the need to update the network path. Based on the frequency of changes in MTU values for one or both of the gateways, the existence of the error messages and dropped data packets (thereby requiring that the same data packets be transmitted multiple times) would pose a problem associated with efficiency of network communications.

The present invention aims to minimize or avoid dropping data packets all together as described above in the scenarios illustrated in FIG. 2 and FIG. 3. In order to minimize or avoid dropping data packets, the present invention first aims to establish an optimal MTU value between the two gateways for the tunnel when the tunnel first initializes. This is in contrast, as illustrated in FIG. 2, to the situation where the MTU is readjusted after the tunnel has been established. Each of the gateways communicate with each other and negotiate a reasonable MTU value to use initially thereby potentially avoiding situations illustrated in steps 5-8 (235-250) of FIG. 2.

The present invention also aims to maintain in sync the MTU values between the two gateways while the tunnel is running. In particular, each of the gateways will be instructed to advertise their current MTU value when any changes have occurred/detected during the tunnel's lifetime. In doing so, the gateways would be capable of adjusting the MTU value accordingly, such as before the next transmission of data. This adjusting/updating can potentially avoid situations illustrated in steps 5-10 (335-360) of FIG. 3.

The present invention, as described in further detail below, may utilize various communication protocols to establish negotiations that will adjust the MTU values of one or both gateways as needed. The two gateways, for example, may negotiate using Internet Key Exchange (e.g., IKE, RFC 2409) or Internet Key Exchange Protocol Version 2 (e.g., IKEv2, RFC 5996). These protocols are used to set up security association in an Internet Protocol Security (IPsec) suite that facilitates secure communications (i.e. VPN) by authenticating and encrypting each data packet being communicated between the gateways. The IKE and IKEv2 protocols define several functions for peer notification within the tunnel's lifetime. With the present invention, modifications are included that utilize these protocols so that the negotiations regarding PMTU can be carried out between the gateway peers.

Figure 4:
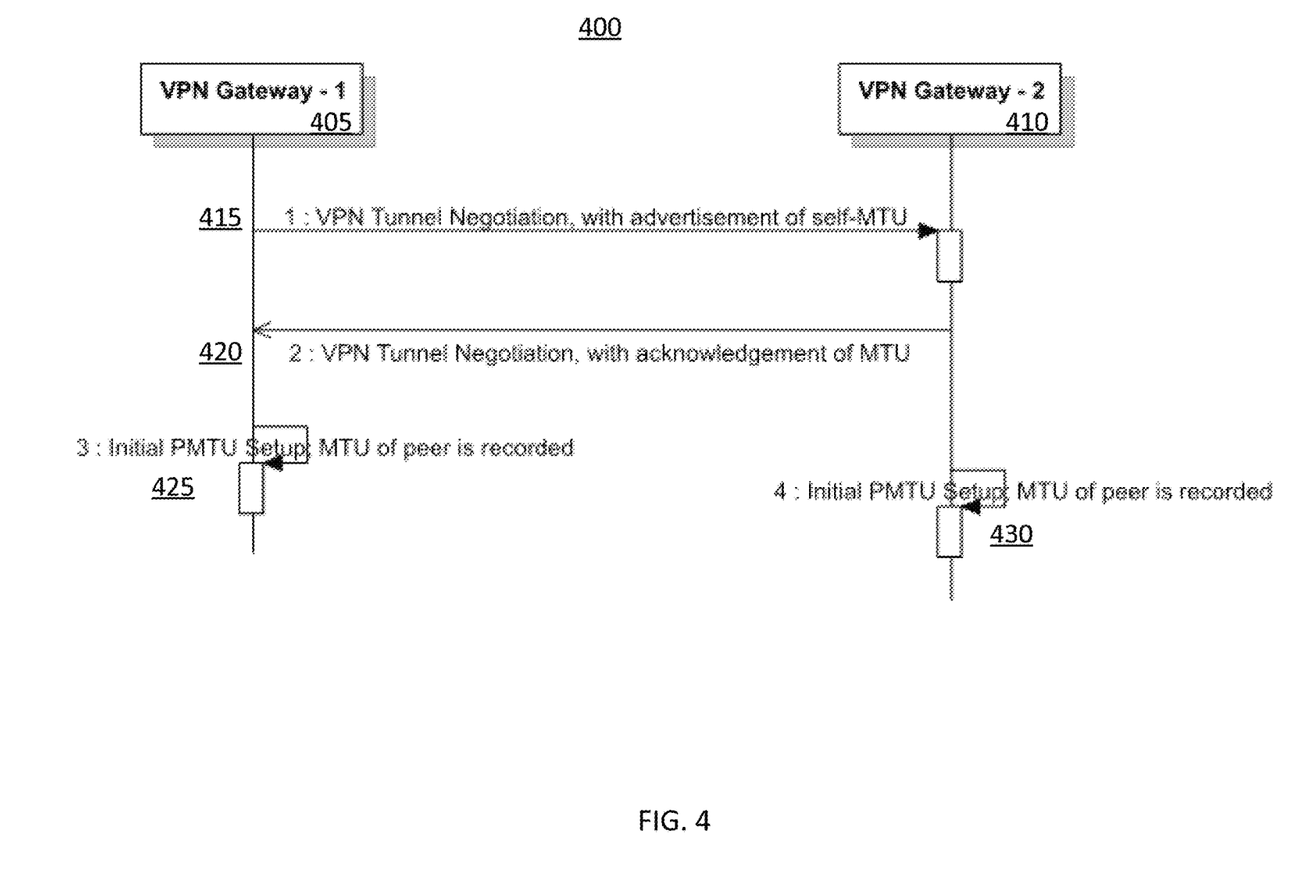
FIG. 4 illustrates a method for establishing an initial MTU negotiation.

FIG. 4 illustrates a method for establishing an initial MTU negotiation. The method 400 regarding the initial MTU negotiations would facilitate associating MTU values for each of the gateways 405, 410 while the network tunnel is still being established for a particular VPN connection. The negotiations can ensure that once communication begins between the gateways 405, 410, data packets will be less likely to be dropped due to an initial difference or incompatibility between the MTU values of each of the gateways 405, 410.

In step 1 (415), gateway 1 (405) of FIG. 4 advertises its current MTU value to gateway 2 (410) during the tunnel negotiation phase (i.e. set up). Gateway 1 (405) calculates its own MTU value using similar methods as described above in FIG. 1 and FIG. 2. This MTU value is acknowledged by gateway 2 (410).

In step 2 (420), gateway 2 (410) provides its own MTU value to gateway 1 (405). This step occurs sequentially after step 1 although in some embodiments the order of the gateways may be switched. Similar to step 1 (415), gateway 2 (310) calculates its own MTU value and advertises it to gateway 1 (405).

In step 3 (425) and step 4 (430), each respective gateway establishes their own MTU value. This established MTU value is based on their own MTU value as well as the value provided from their peer in either step 1 (415) or step 2 (420). Generally, an MTU value is selected based on the minimum of the two MTU values associated with each of the gateways. For example, using the scenario illustrated in FIG. 2, if the MTU value for gateway 1 was 1452 and the MTU value for gateway 2 was 1432, the selected MTU value used for the tunnel (as described so far in FIG. 4) would initially be 1432.

It should be noted that in some embodiments, an MTU value that is less than the minimum of both the advertised MTU values of the gateways may be chosen. Generally, an MTU value may be chosen in order to ensure that the amount of data to be transferred between gateways is maximized based on the capabilities of each of the gateways. However, it may be decided that a lesser MTU value would be chosen in order to take into account possible fluctuations in the MTU value of one or both of the gateways once communication between the two have already begun. As described above in FIG. 3, changes in MTU values may result in dropped data packages as one or both of the gateway MTU values may have dropped below what was initially established during the tunnel negotiations. Furthermore, needing to update MTU values of one or both gateways may require time and resources if such changes are frequent (although the time and resources used would be less than if the packet was transmitted and dropped).

With the method 400 of FIG. 4, both gateways (405, 410) established an initial MTU value during the tunnel negotiation. This ensures that, at least initially, data packets being transferred between the gateways using the network tunnel will be successful. The method 400 overcomes the issues of network inefficiency raised in FIG. 2 where the MTU values of the gateways may not be compatible after an initial tunnel negotiation.

As discussed above with FIG. 3, even after establishing the tunnel between the gateways, changes in the performance of one or more of the gateways may occur after the tunnel has been established. Changes in the gateway MTU value may occur for a variety of reasons (e.g., network congestion, failure/damage with respect to the gateway). These changes in the MTU value may end up being significant enough where data packets would be dropped until the MTU values of the gateways become adjusted in view of the change. The present invention aims to avoid the situation where changes in the MTU values of one or more of the gateway causes data packets to drop by updating changes as they occur. Furthermore, the MTU updates may be performed before any data packets are sent using the tunnel.

Figure 5:
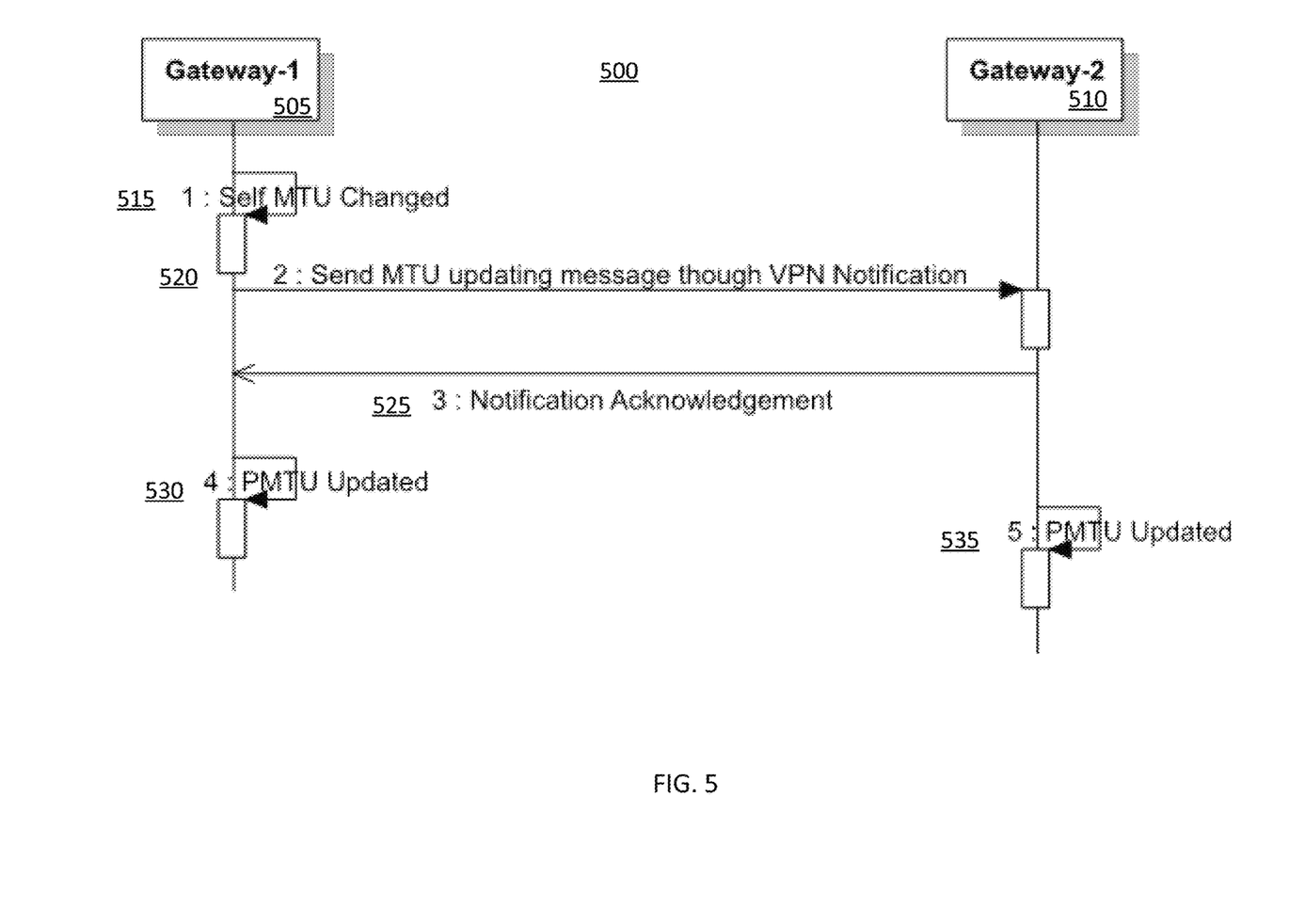
FIG. 5 illustrates a method for updating MTU between the two gateways after the network tunnel has been established.

FIG. 5 illustrates a method 500 for updating PMTU between the two gateways 505, 510 after the network tunnel has been established. Instead of updating the gateways once a data packet has been dropped because of an MTU value change with one or more gateways (see, FIG. 3), the MTU values of each gateways (505, 510) are notified to the other as soon as a MTU change is detected. In some embodiments, these notifications may be triggered if it exceeds a predetermined amount. In any case, any changes in MTU values of one or more gateways can be responded to before data packets could potentially be dropped.

In step 1 (515), gateway 1 (505) may have detected an MTU change. Although any change in MTU can be detected at any time, there may be embodiments where the change can be detected at a pre-determined interval in time. Alternatively changes in MTU can be detected whenever a change in MTU value is detected. In some embodiments, the MTU value may need to change by a pre-determined amount before the change is detected. These alternatives can be implemented in situations where smaller changes in MTU may not negatively affect the transmission of data across the established tunnel. Furthermore, there may be benefits associated with limiting the frequency of updating MTU changes.

In step 2 (520), gateway 1 (505) provides the updated MTU change that it detected to gateway 2 (510). The update MTU change can be provided, for example, through a notification message. The notification message may provide the new MTU value for the gateway after the change. The update can be provided between transmission of data packets between the gateways (e.g., after completion of a current transmission of data but before transmission of the next data packet).

In other embodiments, the notification message may also include additional information such as the reason why the change was detected and when the change was detected. If for some reason the change in MTU value for the gateway is temporary (i.e. reduced MTU value for a pre-determined period of time), such indication can also be provided in this notification message. If these additional information is to be included in the notification message, structural changes to the notification payload may be needed so that the additional information can be included.

Although FIG. 5 illustrates a scenario where gateway 1 (505) has detected a changed MTU and provides the update to gateway 2 (510), in other situations where gateway 2 (510) has detected an MTU change, gateway 2 (510) would similarly provide update message through a notification message to gateway 1 (505) (i.e. step 2). Lastly, in the last scenario where both gateways detect changes in MTU value, each of the gateways can provide the other with their updated MTU value in a similar manner as described above.

In step 3 (525), gateway 2 (510) provides acknowledgement regarding the received notification message to gateway 1 (505). In some embodiments, if this acknowledgment from gateway 2 (510) is not received within a pre-determined period of time, gateway 1 (505) may be instructed to re-transmit the notification message. This retransmission is to ensure that gateway 2 (510) actually received the update in case the notification message not successfully received before.

Once the update message (i.e. step 2) and the notification acknowledgement (i.e. step 3) have been performed, each of the gateways can update their own MTU value in step 4 (530) and step 5 (535). The MTU value of each of the gateways may be set to a value that is the minimum of both current MTU values of the gateways. As noted above, in some situations, the MTU value that both the gateways are updated to may be a value that is less than the minimum.

By updating the MTU values of the gateways whenever one or both the gateways detect an MTU change, the gateways can ensure that the data is being transmitted successfully through the tunnel thereby avoiding dropping packets as illustrated in FIG. 3. Furthermore, by performing the updates whenever MTU changes are detected, a complete PMTUD would not need to be performed.

Although examples were provided above where MTU values of one or both of the gateways decrease (corresponding to a situation where less data can be transmitted across the tunnel), there may also include scenarios where the MTU values of one or both of the gateways increase in a manner such that the minimum of both current MTU values increase (corresponding to a situation where more data can be transmitted across the tunnel). The method of FIG. 4 can also be used to update the MTU values of each gateway, in view of the increase of the overall minimum MTU value of both gateways, in such a way as to better utilize the available bandwidth. This may include setting the MTU value of both gateways to the minimum MTU value now dictated by the updated increased MTU value.

Figure 6:
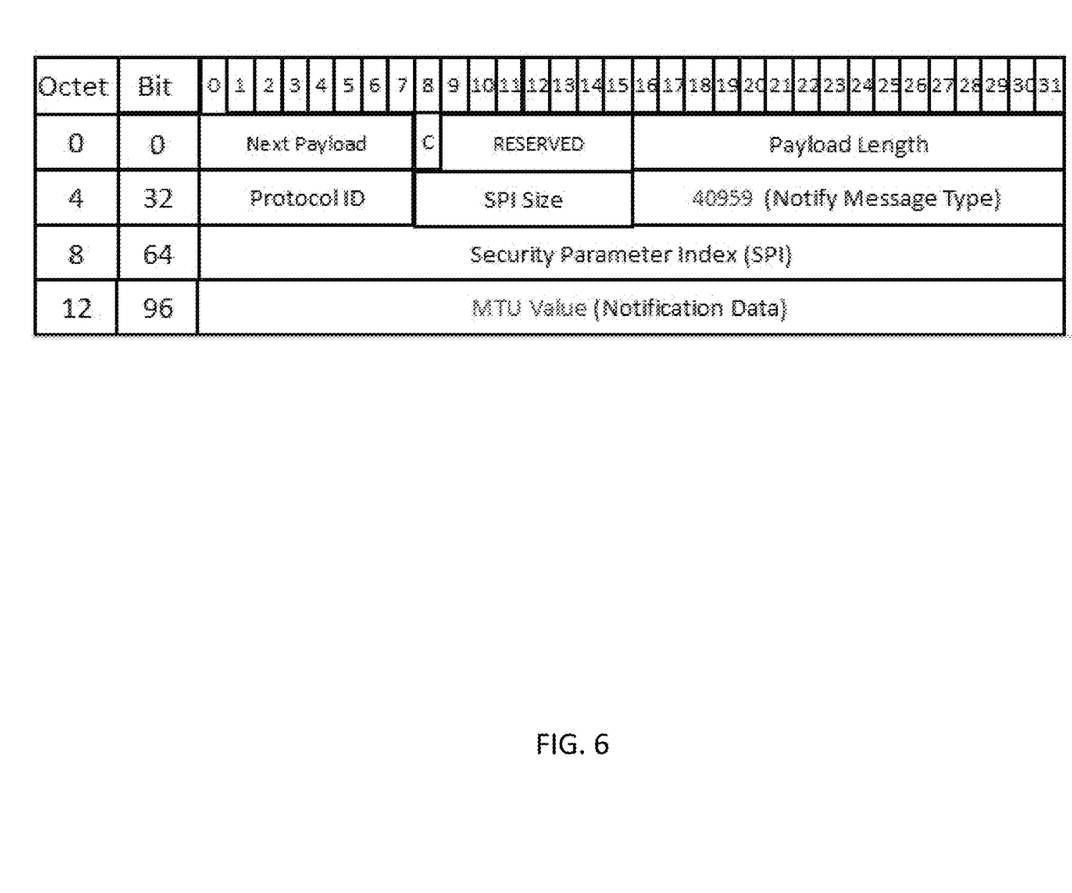
FIG. 6 illustrates an exemplary notification payload.

FIG. 6 illustrates an exemplary notification payload. In particular, whenever one or both of the gateways (as described in the scenarios illustrated in FIG. 4 and FIG. 5) wishes to provide MTU values to the other gateway, this exemplary notification payload can be used.

FIG. 6 illustrates an exemplary extended Internet Security Association and Key Management Protocol Notification payload. This payload is defined by RFC 2408 used for establishing security associations and cryptographic keys in an internet environment (e.g., VPN). As seen in the figure, '40959' is included in the Notify Message Type subsection. This input is used to indicate that an updated MTU value is being transmitted within this particular notification payload. The updated MTU value is carried inside the notification data field of the payload, which occupies 32 bits.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. For example, the data visualization systems and methods described herein may be usable in areas outside of the music industry. It is intended that the scope of the technology be defined by the claim.

What is claimed is:

1. A method for path maximum transmission unit discovery, the method comprising:
    executing instructions stored in memory by a processor, wherein the instructions are executable to perform tunnel negotiations between a first gateway and a second gateway and the performed tunnel negotiations includes:
    calculating maximum transmission unit values for each gateway, and
    advertising the calculated maximum transmission unit value, wherein the calculated maximum transmission unit value for the first gateway is advertised to the second gateway and the calculated maximum transmission unit value for the second gateway is advertised to the first gateway;
    acknowledging receipt of the advertised maximum transmission unit value by each gateway in the tunnel negotiations;
    calculating an initial maximum transmission unit value for use by each of the gateways in the tunnel negotiations, wherein the calculated initial maximum transmission unit value:
        specifies characteristics of the data that can be transmitted between the first and the second gateway using a tunnel established by the tunnel negotiations, and incorporates an associated overhead value for each data packet being transmitted via an established network tunnel;

establishing the network tunnel between the first gateway and the second gateway using the calculated initial maximum transmission unit value; and transmitting data between the first gateway and the second gateway using the established network tunnel, wherein the transmission of data is based on the calculated initial maximum transmission unit value.

2. The method of claim 1, further comprising generating an error message associated with a transmitted data packet being received by a gateway when the transmitted data packet has a maximum transmission unit value that is greater than the calculated initial maximum transmission unit value.

3. The method of claim 2, wherein the generated error message includes an updated maximum transmission unit value associated with the gateway receiving the transmitted data packet, the updated maximum transmission unit value being less than the maximum transmission unit value of the transmitted data packet.

4. The method of claim 3, wherein the generated error message is provided to another gateway so that the another gateway can re-adjust its own maximum transmission unit value to coincide with the maximum transmission unit value of the gateway that generated the error message, the readjusted maximum transmission unit value being used to re-transmit the data packet that prompted the generated error message.

5. The method of claim 1, further comprising:
identifying that a maximum transmission unit value of the second gateway has changed to a different value than the initial maximum transmission unit value; and
sending a notification to the second gateway that includes a maximum transmission unit value that the first gateway can currently support.

6. The method of claim 5, further comprising:
receiving an acknowledgement from the second gateway in response to the notification sent to the second gateway;
updating a maximum transmission unit value at the first gateway to a value that does not exceed the different maximum transmission unit value of the second gateway; and
transmitting data between the first gateway and the second gateway based on the updated maximum transmission unit value.

7. The method of claim 1, wherein the data transmitted between the first gateway and the second gateway is encrypted.

8. A non-transitory computer-readable storage medium having embodied thereon a program executable by a processor for implementing a method for path maximum transmission unit discovery, the method comprising:
executing instructions stored in memory by a processor, wherein the instructions are executable to perform tunnel negotiations between a first gateway and a second gateway, wherein the performed tunnel negotiations includes:
calculating maximum transmission unit values for each gateway, and
advertising the calculated maximum transmission unit value, wherein the calculated maximum transmission unit value for the first gateway is advertised to the second gateway, and wherein the calculated maximum transmission unit value for the second gateway is advertised to the first gateway;
acknowledging receipt of the advertised maximum transmission unit value by each gateway in the tunnel negotiations;
calculating an initial maximum transmission unit value for use by each of the gateways in the tunnel negotiations, wherein the calculated initial maximum transmission unit value:
specifies characteristics of the data that can be transmitted between the first and the second gateway using a tunnel established by the tunnel negotiations, and
incorporates an associated overhead value for each data packet being transmitted via an established network tunnel;
establishing the network tunnel between the first gateway and the second gateway using the calculated initial maximum transmission unit value; and
transmitting data between the first gateway and the second gateway using the established network tunnel, wherein the transmission of data is based on the calculated initial maximum transmission unit value.

9. An apparatus for path maximum transmission unit discovery, the apparatus comprising:
a processor that executes instructions out of the memory to perform tunnel negotiations between a first gateway and a second gateway via the network interface, wherein the performed tunnel negotiations includes:
calculating maximum transmission unit values for each gateway, and
advertising the calculated maximum transmission unit value, wherein the calculated maximum transmission unit value for the first gateway is advertised to the second gateway and the calculated maximum transmission unit value for the second gateway is advertised to the first gateway;
acknowledging receipt of the advertised maximum transmission unit value by each gateway in the tunnel negotiations; and
calculating an initial maximum transmission unit value for use by each of the gateways in the tunnel negotiations, wherein the calculated initial maximum transmission unit value:
specifies characteristics of the data that can be transmitted between the first and the second gateway using a tunnel established by the tunnel negotiations, and
incorporates an associated overhead value for each data packet being transmitted via an established network tunnel; and
a network interface that:
establishes the network tunnel between the first gateway and the second gateway using the calculated initial maximum transmission unit value, and
transmits data between the first gateway and the second gateway using the established network tunnel, wherein the transmission of data is based on the calculated initial maximum transmission unit value.

10. The apparatus of claim 9, wherein an error message is generated that is associated with a transmitted data packet being received by a gateway when the transmitted data packet has a maximum transmission unit value that is greater than the calculated initial maximum transmission unit value.

11. The apparatus of claim 10, wherein the generated error message includes an updated maximum transmission unit value associated with the gateway receiving the transmitted data packet, the updated maximum transmission unit value being less than the maximum transmission unit value of the transmitted data packet.

12. The apparatus of claim 11, wherein the generated error message is provided to another gateway so that the another gateway can re-adjust its own maximum transmission unit value to coincide with the maximum transmission unit value of the gateway that generated the error message, the readjusted maximum transmission unit value being used to re-transmit the data packet that prompted the generated error message.

13. The apparatus of claim 9, wherein:
an identification is made that the second gateway has changed its maximum transmission unit value to a different value than the initial maximum transmission unit value, and
a notification is sent to the second gateway that includes a maximum transmission unit value that the first gateway can currently support.

14. The apparatus of claim 13, wherein:
an acknowledgement is received via the network interface from the second gateway in response to the notification sent to the second gateway;
a maximum transmission unit value at the first gateway is updated to a value that does not exceed the different maximum transmission unit value of the second gateway; and
data between the first gateway and the second gateway is transmitted via the network interface based on the updated maximum transmission unit value.

15. The apparatus of claim 11, wherein the data transmitted between the first gateway and the second gateway is encrypted.

* * * * *